(No Model.)

C. P. WHITE.
STOVE.

No. 348,808. Patented Sept. 7, 1886.

WITNESSES:
H. E. Barry
Albert W. Spear

INVENTOR:
Chas. P. White
by W. W. H. Down
Atty.

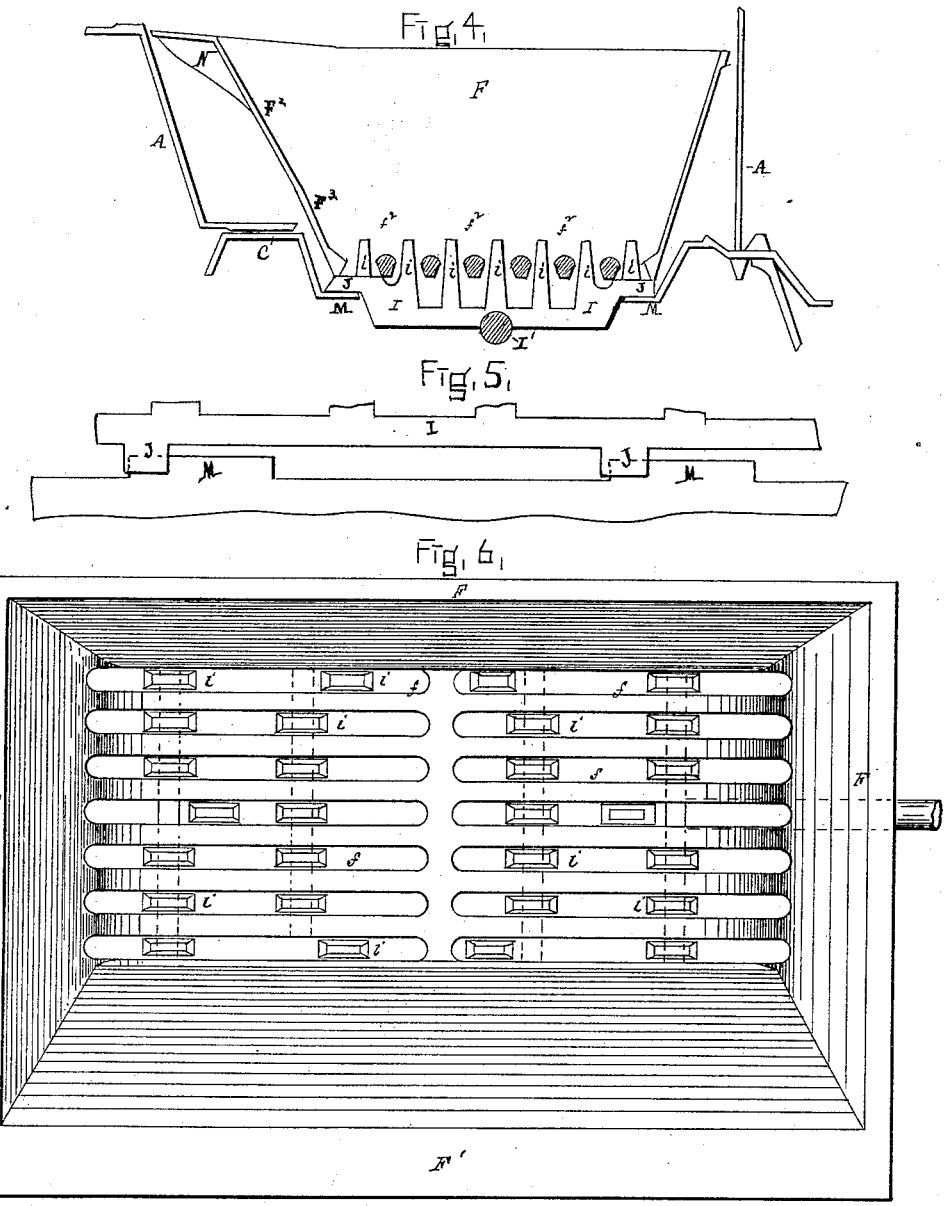

UNITED STATES PATENT OFFICE.

CHARLES P. WHITE, OF TAUNTON, MASSACHUSETTS, ASSIGNOR TO WHITE, WALKER & COMPANY, OF SAME PLACE.

STOVE.

SPECIFICATION forming part of Letters Patent No. 348,808, dated September 7, 1886.

Application filed April 30, 1885. Serial No. 163,949. (No model.)

*To all whom it may concern:*

Be it known that I, CHARLES P. WHITE, of Taunton, in the county of Bristol and Commonwealth of Massachusetts, have invented certain new and useful Improvements in Stoves, of which the following is a full, clear, and exact specification.

My invention relates to certain improved sifting devices in ranges and stoves, as will be more fully hereinafter described and claimed.

The agitator or frame provided with raking-fingers is constructed to remain in its place in the stove; but the sifting-pan can be easily removed by means of a handle adapted to it in front, and by the aid of certain lugs which raise it above the fingers of the agitator. These lugs also assist in the operation of replacing the pan by keeping it from coming in contact with the fingers of the agitator until the pan is in the right position, when these lugs drop into depressions in the frame upon which the flange of the pan rests. The agitator or raking frame slides by means of lugs upon its sides and short flanges projecting from the side of the stove, so that the action of raking keeps these flanges clear of ashes and cinders.

The object of my invention is to provide a stove with the devices hereinafter described and claimed.

My improved device not only enables one to sift the ashes inside the hearth of the stove, and thus avoid the dust resulting from the operation outside the stove, but it also affords an easy method of handling the coal saved by the operation of sifting in that the ash-sifting pan is constructed with a handle and other appliances, so that it is easily removed from the hearth and again placed therein.

Figure 1:
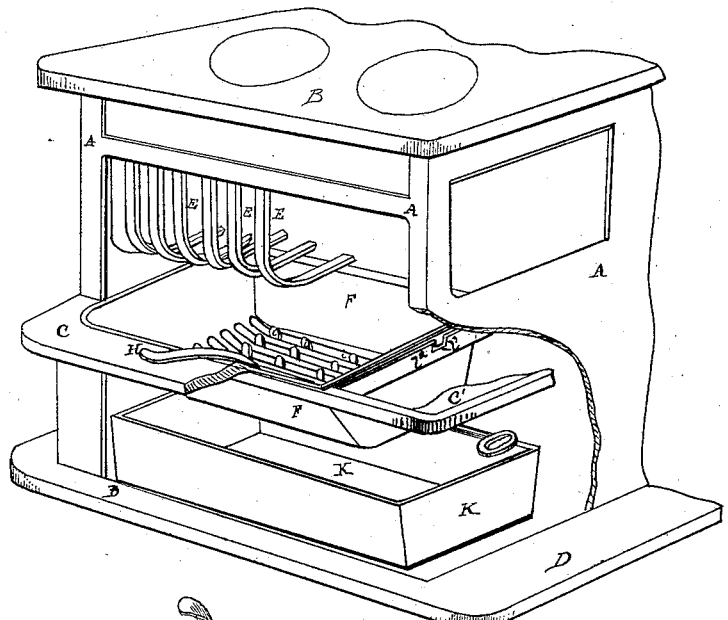
Figure 2:
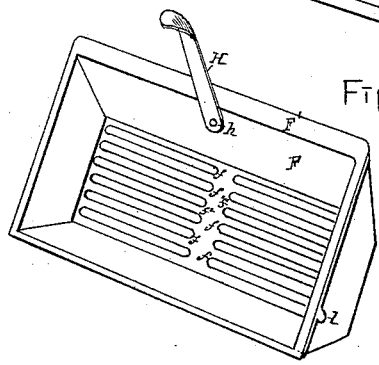
Figure 3:
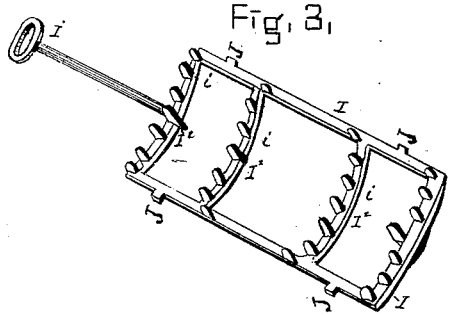

In the accompanying drawings, Figure 1 is a perspective view of a stove, the front and a portion of one of the sides being removed, showing my improved ash-sifting pan and agitator in position. Fig. 2 is a perspective view of my improved ash-sifting pan. Fig. 3 is a perspective view of my improved agitator or raking frame. Fig. 4 is a cross-section of my ash-shifting pan and its agitator in working position, and of the frame of the stove adjacent thereto. Fig. 5 is a plan view of one side of the agitator and two flanges of the stove, showing how the lugs of the agitator rest upon the flanges of the stove, which lugs support the agitator, and slide upon the flanges. Fig. 6 is is a plan view of a modified form of my ash-sifting pan and agitator in position, the end of the pan meeting the bottom in curves.

A is the front and side frame of the stove; B, the top, C the hearth, C' the middle bottom, and D the lower hearth, of the stove. E E is the fire-grate; F, my improved ash-sifting pan. H is the handle of the pan, capable of being turned down around the pivot $h$ as an axis.

$ff$ are longitudinal slots, through which the fingers $i\ i$ project vertically upward from the agitator I, which rests, by means of lugs J J, upon flanges M, secured to the inside of the stove. A handle, I', is secured to the agitator and is operated from the outside of the stove. A lug or lugs, N, are cast upon the front of the ash-shifting box, to allow of its being more easily slipped into place, and these lugs, acting in conjunction with lugs $l$, which slide upon the shelf or flange $l^2$, keep the ash-pan from coming in contact with the raking-frame until the pan is in its proper position. The back lugs then slip into the notches $l^3$. By means of the fact that the flanges M are short, the lugs J, sliding upon them, keep them clear of ashes or other obstructions.

The raking-frame I consists of a rectangular frame having a handle, I', and cross-bars I², with fingers $i\ i$ projecting upward and adapted in size to pass through the slots $f$ of the pan F. The ash or coal pan has a bottom consisting of bars $f^2$ of the peculiar shape shown in the cross-section in Fig. 4. The bars are wedge-shaped with a rounded top. This enables the ashes to easily fall through. The lugs $l$ must be of a sufficient length to raise the pan above the fingers of the agitator. The size of the lugs N $l$ should be made proportionate to the length of the fingers of the agitator, so that the ash-pan will easily slide into position without coming in contact with the fingers. The peculiar shape of the ash-pan, having its front end of the shape shown at F² F³ in Fig. 4, enables the pan to be the more easily withdrawn from the stove and replaced in position again. As shown in Fig. 6 by the shading, the ends of the pan can meet the bottom in curves, through which the slots $ff$ extend, thus allowing the fingers $i\ i$ of the agitator to pass back and forth without hitting the ends of the pan.

Having thus fully described my invention, what I claim is—

1. The combination, with a stove having notched supporting-flanges $l^2$, extending from front to rear across the ash-pit, and flanges on the front and rear walls of said ash-pit below the flanges $l^2$, of a sifting-pan having a slotted bottom and lugs $l$ on its ends for engaging the notches of the flanges $l^2$, and an agitator-frame having fingers $i\ i$, supported on the flanges below the pan, the distance between the top of the flanges $l^2$ and the top of the agitator-frame being equal to the depth of the pan, substantially as and for the purpose described.

2. The combination, with a stove having a sifting-pan below the grate, provided with a slotted bottom and short flanges on the walls of the ash-pit below the pan, of an agitator-frame having fingers which engage the slots of the pan, and provided with lugs resting on the flanges of the ash-pit, substantially as and for the purpose described.

In witness whereof I have hereunto set my hand.

CHAS. P. WHITE.

Witnesses:
WM. B. H. DOWN,
ALBERT W. SPEAR.